Patented May 16, 1933

1,909,851

UNITED STATES PATENT OFFICE

ARTHUR ZITSCHER AND WILHELM SEIDENFADEN, OF OFFENBACH-ON-THE-MAIN, GERMANY, ASSIGNORS TO GENERAL ANILINE WORKS, INC., OF NEW YORK, N. Y., A CORPORATION OF DELAWARE

DIAZO-SULPHONATES

No Drawing. Application filed December 4, 1931, Serial No. 579,114, and in Germany December 9, 1930.

Our present invention relates to new diazo sulphonates, more particularly to those corresponding to the probable general formula

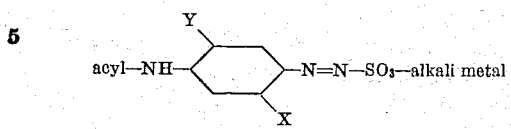

wherein X and Y mean alkyl, alkoxy or halogen.

These compounds are produced by treating the corresponding 2.5-disubstituted-diazo-4-acylamino-benzenes with an alkali metal sulphite in the manner described in Berichte der deutschen chemischen Gesellschaft vol. 30, page 71.

They are of a great value for the production of azo-dyestuffs, as described in our copending U. S. application Serial No. 579,115 filed on December 4, 1931 in the name of Arthur Zitscher and Wilhelm Seidenfaden.

In order to further illustrate our invention the following examples are given, the parts being by weight and all temperatures in centigrade degrees. But we wish it to be understood that we are not limited to the particular conditions or specific products mentioned therein.

Example 1

21.9 parts of 2.5-dichloro-4-acetylamino-1-amino-benzene are diazotized in the customary manner by means of 35 parts of hydrochloric acid of 20° Bé. and 7 parts of sodium nitrite. The diazo solution thus formed is introduced at 10-15° into a solution of 13 parts of anhydrous sodium sulphite and 11 parts of calcined sodium carbonate. The orange-yellow solution is stirred, until unchanged diazo-compound is no longer found. By adding common salt, the sodium salt of 2.5-dichloro-4-acetylamino-benzene-1-diazo-sulphonic acid precipitates in the form of orange yellow crystals. It corresponds to the probable formula

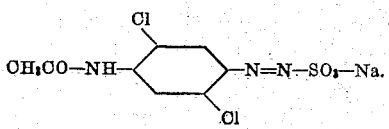

Example 2

The diazo solution prepared in the customary manner by starting from 27.2 parts of 4-benzoylamino-2.5-dimethoxy-1-amino-benzene is introduced at 10-15° into an aqueous solution of 20 parts of crystallized potassium sulphite and 10 parts of potassium acetate. After the addition of potassium chloride the precipitate is filtered and dried. The 4-benzoylamino-2.5-dimethoxy-benzene-1-diazo-sulphonate thus obtained in the form of yellow needles corresponds to the probable formula

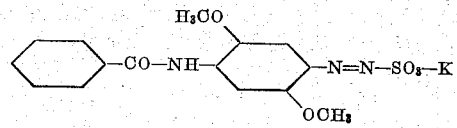

Example 3

A diazo solution which is prepared by means of 25.6 parts of 4-benzoyl-amino-2-methoxy-5-methyl-1-amino-benzene, 29 parts of hydrochloric acid of 20° Bé. and 6.9 parts of sodium nitrite is allowed to run at 10-15° into a solution of 25.2 parts of anhydrous sodium sulphite and 250 parts of water. The mass is stirred for ¼ hour, mixed with 300 parts of common salt and stirred again for 3 hours. The 2-methoxy-5-methyl-4-benzoyl-amino-benzene-1-diazo-sulphonate precipitates in the form of small yellow needles which are isolated in the customary manner. This diazo-sulphonate corresponds probably to the formula

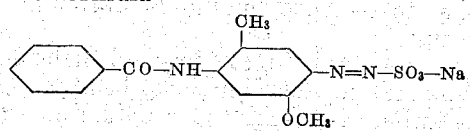

Example 4

A diazo solution which is prepared in the usual manner by means of 27.65 parts of 4-benzoylamino-2'-methoxy-5-chloro-1-amino-benzene, 35 parts of hydrochloric acid of 20° Bé. and 6.9 parts of sodium nitrite is allowed to run at 10-15°, while stirring, into a solution of 14 parts of anhydrous sodium sulphite, 11 parts of calcined sodium carbonate and 150 parts of water. Thereby the 2- methoxy-5-chloro-4-benzoylamino-benzene-1-diazo-sulphonate precipitates partially in the form of small yellow crystals. In order to complete the precipitation 150 parts of common salt are added and the diazo sulphonate is isolated in the usual manner. It corresponds probably to the formula

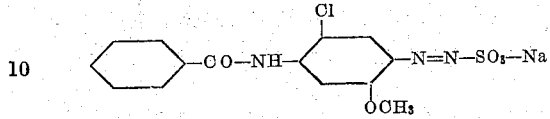

Example 5

A diazo solution which is prepared in the usual manner by means of 32.2 parts of 4(4'-methyl-benzene-sulphonyl-amino)-2.5-dimethoxy-1-amino-benzene, 29 parts of hydrochloric acid of 20° Bé. and 6.9 parts of sodium nitrite is allowed to run at room temperature, while stirring, into a solution of 14 parts of anhydrous sodium sulphite, 7 parts of calcined sodium carbonate and 150 parts of water. Thereby the sodium salt of 4(4'-methyl-benzene-sulphonyl-amino)-2.5-dimethoxy-benzene-1-diazo-sulphonic acid precipitates partially in the form of small yellow crystals. By the addition of 250 parts of common salt the precipitation is completed and the product is isolated in the customary manner. It corresponds probably to the formula

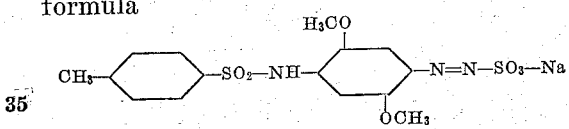

In an analogous manner the corresponding diazosulphonates are obtained by starting from other 2.5-disubstituted-4-acylamino-1-amino-benzenes of the above mentioned kind, as for instance:

1-amino-4-benzoylamino-2.5-dimethylbenzene 1-amino-4-benzoylamino-2-methyl-5-chlorobenzene 1-amino-4-benzoylamino-2-methoxy-5-methylbenzene 1-amino-4-(α- or β-naphthoylamino)-2-methoxy-5-methylbenzene 1-amino-4-benzoylamino-2-chloro-5-methyl-benzene 1-amino-4-(3'-methoxy-naphthalene-2'-carbonylamino)-2.5-dimethoxy-benzene 1-amino-4-(2'-chlorobenzoylamino)-2.5-diethoxybenzene 1-amino-4-benzoylamino-2.5-diethoxybenzene 1-amino-4-benzoylamino-2.5-dibutoxybenzene 1-amino-4-(4'-methoxybenzolyamino)-2-methoxy-5-chlorobenzene 1-amino-4-benzoylamino-2-ethoxy-5-bromobenzene 1-amino-4-benzoylamino-2-chloro-5-methoxybenzene 1-amino-4-propionylamino-2.5-dichlorobenzene 1-amino-4-benzenesulphonylamino-2.5-diethoxybenzene 1-amino-4-(4'-methyl-benzene-1'-sulphonylamino)-2-methoxy-5-methyl-benzene.

We claim:

1. The diazo-sulphonates corresponding to the probable general formula:

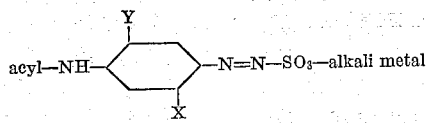

wherein X and Y means alkyl, alkoxy or halogen, which compounds represent when dry yellowish to brownish powders and are valuable intermediates for the production of azo dyestuffs.

2. The diazo-sulphonates corresponding to the probable general formula:

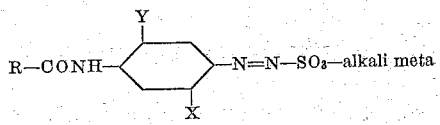

wherein X and Y means alkyl, alkoxy or halogen and R a radical of the aromatic isocyclic series, which compounds represent when dry yellowish to brownish powders and are valuable intermediates for the production of azo dyestuffs.

3. The diazo-sulphonates corresponding to the probable general formula:

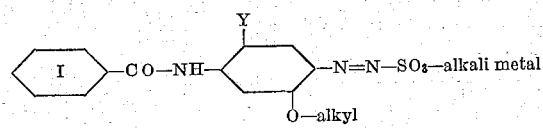

wherein the benzene nucleus I may contain alkyl, alkoxy or halogen and Y means alkyl, alkoxy or halogen, which compounds represent when dry yellowish to brownish powders and are valuable intermediates for the production of azo dyestuffs.

4. The 4-benzoylamino-2-methoxy-5-methyl-benzene-1-diazo-sulphonate of the probable formula:

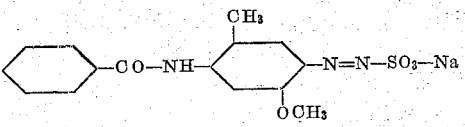

which compound represents when dry small yellow needles and is a valuable intermediate for the production of azo dyestuffs.

5. The 4-benzoylamino-2-methoxy-5-chloro-benzene-1-diazo-sulphonate of the probable formula:

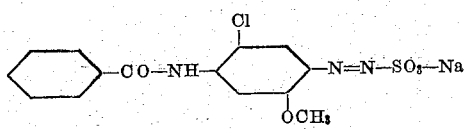

which compound represents small yellow crystals and is a valuable intermediate for the production of azo dyestuffs.

6. The 2.5-methoxy-4-benzoylamino-benzene-1-diazo-sulphonate of the probable formula:

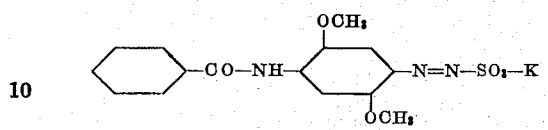

which compound represents yellow needles and is a valuable intermediate for the production of azo dyestuffs.

In testimony whereof, we affix our signatures.

ARTHUR ZITSCHER.
WILHELM SEIDENFADEN.